US012722402B2

(12) United States Patent
Muramatsu et al.

(10) Patent No.: US 12,722,402 B2
(45) Date of Patent: Sep. 1, 2026

(54) PRINTING DEVICE HAVING PERIPHERAL SURFACE ON WHICH FIRST AND SECOND ATTACHMENT PORTIONS TO WHICH ACCESSORY IS ATTACHABLE ARE PROVIDED

(71) Applicant: BROTHER KOGYO KABUSHIKI KAISHA, Nagoya (JP)

(72) Inventors: Tetsuro Muramatsu, Nagoya (JP); Toshiyuki Furuyama, Chiryu (JP); Sho Asai, Nisshin (JP); Atsuo Hirose, Nagoya (JP); Tomohiro Wada, Nagoya (JP); Yusuke Ikemoto, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 62 days.

(21) Appl. No.: 18/620,069

(22) Filed: Mar. 28, 2024

(65) Prior Publication Data

US 2024/0326470 A1 Oct. 3, 2024

(30) Foreign Application Priority Data

Mar. 30, 2023 (JP) ................................ 2023-054656

(51) Int. Cl.
*B41J 3/407* (2006.01)
*B41J 3/36* (2006.01)
(Continued)

(52) U.S. Cl.
CPC ............ *B41J 3/4075* (2013.01); *B41J 29/00* (2013.01)

(58) Field of Classification Search
CPC ............... B41J 3/36; B41J 3/4075; B41J 3/39
See application file for complete search history.

(56) References Cited

U.S. PATENT DOCUMENTS

2005/0002716 A1 1/2005 Murata et al.
2011/0273860 A1* 11/2011 Corvese .................. B41J 29/02 361/816
(Continued)

FOREIGN PATENT DOCUMENTS

JP 2812506 B2 * 10/1998 ............... B41J 3/36
JP 2002-151858 A 5/2002
(Continued)

OTHER PUBLICATIONS

Koike, MachineTranslationofJP-2812506-B2, 1998 (Year: 1998).*

*Primary Examiner* — Scott A Richmond
(74) *Attorney, Agent, or Firm* — Kenealy Vaidya LLP

(57) ABSTRACT

A printing device includes: a printing engine; a controller; an input interface through which a user can input an instruction into the controller; and a housing accommodating therein the printing engine and the controller. The printing engine is configured to perform printing on a printing medium. The controller is configured to control drive of the printing engine. The housing includes: a first attachment portion to which one end of an accessory for the user to hold the printing device is attachable; and a second attachment portion to which another end of the accessory is attachable. The housing has: a front surface on which the input interface is provided; a rear surface opposing the rear surface; and a peripheral surface connecting the front surface and the rear surface to each other. The first attachment portion and the second attachment portion are provided on the peripheral surface.

19 Claims, 12 Drawing Sheets

(51) Int. Cl.

| | |
|---|---|
| ***B41J 3/39*** | (2006.01) |
| ***B41J 29/00*** | (2006.01) |

(56) References Cited

U.S. PATENT DOCUMENTS

| | | | |
|---|---|---|---|
| 2013/0050385 | A1 | 2/2013 | Tanaka et al. |
| 2016/0059598 | A1 | 3/2016 | Koshigoe |

FOREIGN PATENT DOCUMENTS

| | | | |
|---|---|---|---|
| JP | 2005-022291 | A | 1/2005 |
| JP | 2013-049177 | A | 3/2013 |
| JP | 2015-085529 | A | 5/2015 |

* cited by examiner

PRINTING DEVICE HAVING PERIPHERAL SURFACE ON WHICH FIRST AND SECOND ATTACHMENT PORTIONS TO WHICH ACCESSORY IS ATTACHABLE ARE PROVIDED

REFERENCE TO RELATED APPLICATIONS

This application claims priority from Japanese Patent Application No. 2023-054656 filed on Mar. 30, 2023. The entire content of the priority application is incorporated herein by reference.

BACKGROUND ART

A prior art discloses a conventional tape printing apparatus which is a handheld device having a keyboard section on a front surface thereof. The tape printing apparatus is configured to print characters and the like, which have been inputted through operations on the keyboard section, on tape.

SUMMARY

However, one problem with this conventional tape printing apparatus is that the weight of the tape printing apparatus may cause undue burden to a user when the user holds the tape printing apparatus.

In view of the foregoing, it is an object of the present disclosure to provide a printing device capable of reducing burden on a user when the user holds the printing device.

In order to attain the above and other object, the present disclosure provides a printing device including: a printing engine; a controller; an input interface through which a user can input an instruction into the controller; and a housing. The printing engine is configured to perform printing on a printing medium. The controller is configured to control drive of the printing engine. The housing accommodates therein the printing engine and the controller. The housing includes: a first attachment portion to which one end of an accessory for the user to hold the printing device is attachable; and a second attachment portion to which another end of the accessory is attachable. The housing has: a front surface on which the input interface is provided; a rear surface; and a peripheral surface. The rear surface opposes the rear surface in a front-rear direction. The peripheral surface connects the front surface and the rear surface to each other. The first attachment portion and the second attachment portion are provided on the peripheral surface.

In the above structure, by attaching the accessory to the first attachment portion and the second attachment portion, the user can insert a hand between the housing and the accessory to hold the printing device during use. Accordingly, the user's burden caused by the weight of the printing device when holding the printing device can be reduced. Also, since the user can carry the printing device by holding the accessory, the user's burden when carrying the printing device can also be reduced.

DESCRIPTION

Embodiment

Figure 1:
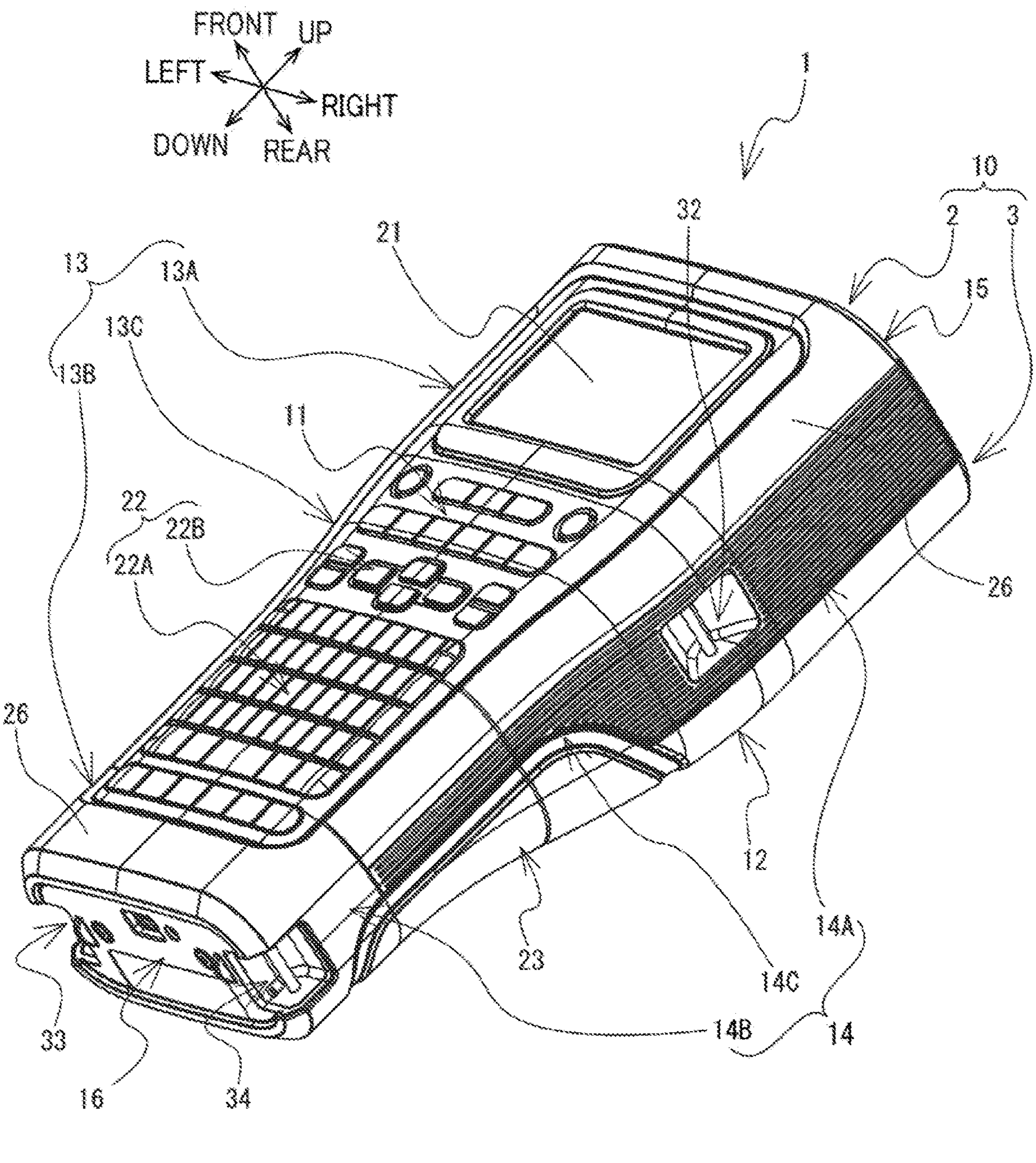
FIG. 1 is a perspective view of a printing device 1.

Hereinafter, a printing device 1 according to one embodiment of the present disclosure will be described while referring to the accompanying drawings.

In the following description, "up", "down", "left", "right", "front", and "rear" indicated by arrows in the drawings will be used to specify directions based on an orientation (a normal posture of the printing device 1) in which a user operates an operation unit 22 of the printing device 1.

The printing device 1 is of a suitable size to be held by the user when operated. In other words, the printing device 1 is designed for handheld use. The printing device 1 can use various tape cassettes such as a receptor type, a thermal type, a laminate type, and a tube type. The tape cassettes accommodate therein various printing media having an elongated shape. The printing media may include single-sided adhesive tape, thermal paper tape, double-sided adhesive tape, film tape, and tube tape, for example, and these printing media will be collectively referred to as "tape". The printing device 1 can perform printing operations for printing characters, figures, and the like on tape.

Figure 2:
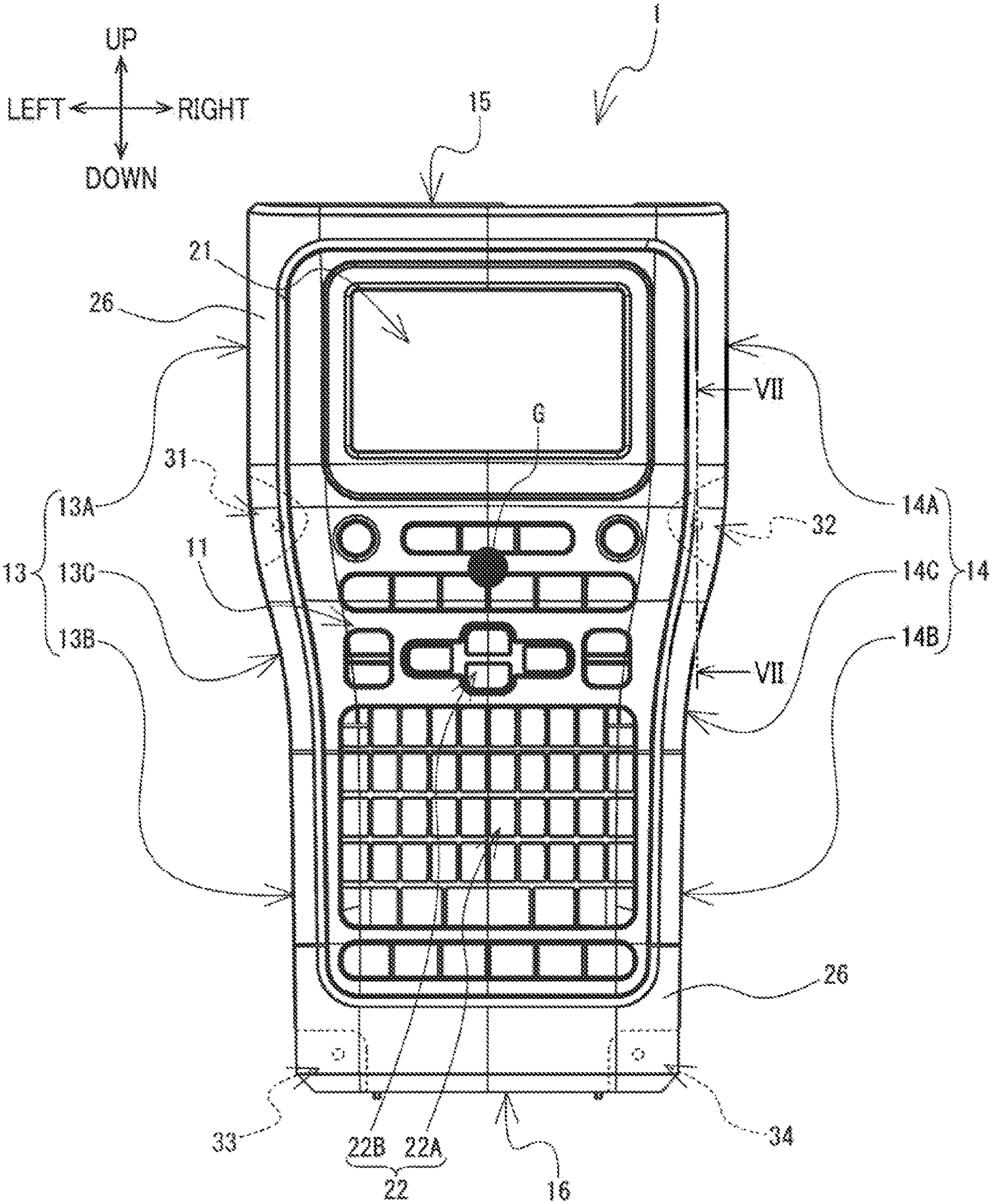
FIG. 2 is a front view of the printing device 1.
Figure 3:
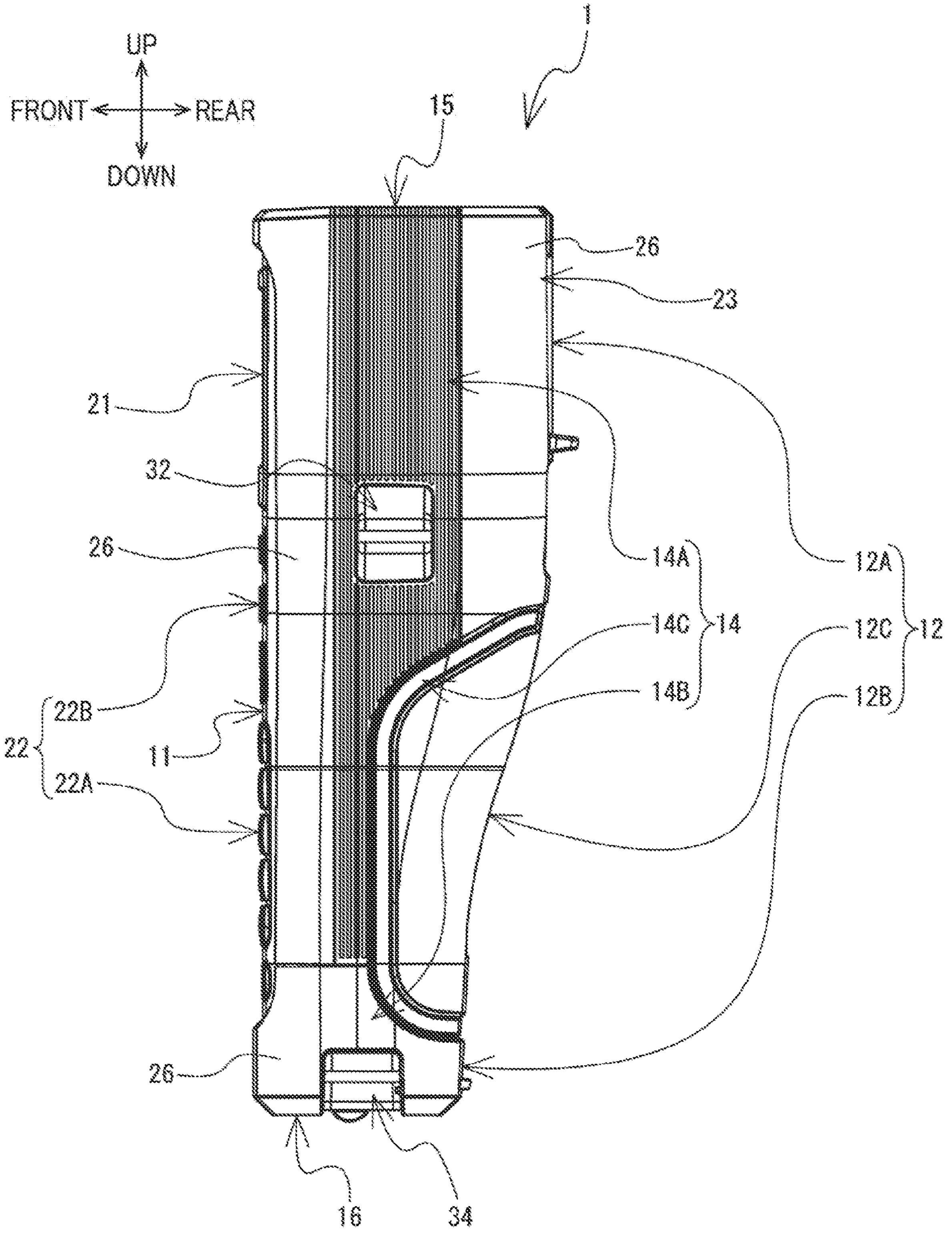
FIG. 3 is a right side view of the printing device 1.

As illustrated in FIGS. 1 through 3, the printing device 1 includes a housing 10, a display unit 21, the operation unit 22, and a cover 23. The housing 10 has a box shape and elongated in an up-down direction. The housing 10 has a front surface 11, a rear surface 12, a left surface 13, a right surface 14, an upper surface 15, and a lower surface 16. The front surface 11 is a surface that the user faces when operating the printing device 1.

The front surface 11 and the rear surface 12 oppose each other in a front-rear direction. The left surface 13 and the right surface 14 oppose each other in a left-right direction. The upper surface 15 and the lower surface 16 oppose each other in the up-down direction. The left surface 13, the right surface 14, the upper surface 15, and the lower surface 16 serve as peripheral surfaces of the housing 10 that connect the front surface 11 and the rear surface 12 to each other. Specifically, the left surface 13 connects a left end portion of the front surface 11 and a left end portion of the rear surface 12 to each other. The right surface 14 connects a right end portion of the front surface 11 and a right end portion of the rear surface 12 to each other. The upper surface 15 connects an upper end portion of the front surface 11 and an upper end portion of the rear surface 12 to each other. The lower surface 16 connects a lower end portion of the front surface 11 and a lower end portion of the rear surface 12 to each other.

The display unit 21 is provided on the front surface 11 at a position upward than an approximate center in the up-down direction thereof. The display unit 21 is a liquid crystal display, for example, and is configured to display thereon various information. Particularly, the display unit 21 is configured to display thereon information related to an operation of the operation unit 22. The operation unit 22 is provided on the front surface 11 at a position downward than the display unit 21 to extend toward a lower end portion of the front surface 11 from a position upper than the approximate center in the up-down direction of the front surface 11. The operation unit 22 is an input interface configured to accept various types of information inputted through user operations.

A portion of the operation unit 22 downward than the approximate center in the up-down direction of the front surface 11 is a character key set 22A. The character key set 22A is used to input letters, numbers, symbols, and the like. A portion of the operation unit 22 upward than the approximate center in the up-down direction of the front surface 11 is a function key set 22B. The function key set 22B includes a power button, a print button, and the like for inputting various instructions into the printing device 1.

The rear surface 12 of the housing 10 is formed with an opening (not illustrated). The opening is in communication with a cassette attachment portion 24 (see FIG. 4) in which a tape cassette (not illustrated) is mountable, and a battery attachment portion 25 (see FIG. 4) in which a battery (not illustrated) is mountable. The cassette attachment portion 24 is provided in an area of the housing 10 that extends upward from an approximate center in the up-down direction thereof toward an upper end portion thereof. The battery attachment portion 25 is provided in an area of the housing 10 downward than the cassette attachment portion 24. The cassette attachment portion 24 and the battery attachment portion 25 are recessed frontward from the rear surface 12 of the housing 10. At the rear of the housing 10, the tape cassette and the battery are mountable in and removable from the respective cassette attachment portion 24 and battery attachment portion 25 in the front-rear direction.

The cover 23 is engageable with a portion of the rear surface 12 defining the opening and functions to open and close the cassette attachment portion 24 and the battery attachment portion 25. The cover 23 extends from an upper end portion of the rear surface 12 toward a lower end portion of the same. Right and left ends of the cover 23 are bent frontward to respectively form portions of the left surface 13 and the right surface 14 of the housing 10.

In a front side view, an upper portion of the housing 10 expands further outward in the left-right direction than a lower portion of the same. The left surface 13 has a first portion 13A, a second portion 13B, and a third portion 13C, and the right surface 14 has a first portion 14A, a second portion 14B, and a third portion 14C.

The first portions 13A and 14A are positioned on opposite sides of the display unit 21 at a position upward than the approximate center in the up-down direction of the housing 10. First attachment portions 31 and 32 to which an accessory is attachable are provided on the respective first portions 13A and 14A. The second portions 13B and 14B are positioned on opposite sides of the character key set 22A in the operation unit 22 at a position downward than the approximate center in the up-down direction of the housing 10. Second attachment portions 33 and 34 to which an accessory is attachable are provided on the respective second portions 13B and 14B.

In a side view, the first attachment portions 31 and 32 are positioned rearward than the respective second attachment portions 33 and 34. The first attachment portions 31 and 32 and the second attachment portions 33 and 34 will be described later.

In the above configuration, it is preferable that the operation unit 22 of the printing device 1 is positioned between the first attachment portions 31 and 32 and the respective second attachment portions 33 and 34 in the up-down direction. The user may attach respective ends of an accessory to the first attachment portion 31 and the second attachment portion 33, for example, and hold the printing device 1 with a hand inserted between the accessory and the left surface 13 of the housing 10. In this case, the user can easily operate the printing device 1 because the operation unit 22 is positioned within an area in the up-down direction of the printing device 1 supported by the user's palm.

Although it is preferable that the entirety of the operation unit 22 is positioned between the first attachment portions 31 and 32 and the second attachment portions 33 and 34 in the up-down direction, in a case where only a portion of the operation unit 22, such as the character key set 22A, is positioned between the first attachment portions 31 and 32 and the second attachment portions 33 and 34, the user can still operate the printing device 1 with ease.

The third portions 13C and 14C are areas between the first portions 13A and 14A and the corresponding second portions 13B and 14B, and are located on opposite sides of the function key set 22B in the operation unit 22. An area in the upper portion of the housing 10 in which the display unit 21 is provided has a size in the left-right direction greater than that of an area in the lower portion of the housing 10 in which the character key set 22A in the operation unit 22 is provided.

Therefore, the first portions 13A and 14A are positioned further toward the side (outward) in the left-right direction relative to the respective second portions 13B and 14B. The third portions 13C and 14C are curved inward in the left-right direction from the respective first portions 13A and 14A toward the corresponding second portions 13B and 14B to connect the respective first portions 13A and 14A and the corresponding second portions 13B and 14B to each other.

In a side view, the upper portion of the housing 10 expands further rearward than the lower portion of the same. The rear surface 12 has a first portion 12A, a second portion 12B, and a third portion 12C. The first portion 12A is positioned rearward of the display unit 21 at a position upward than the approximate center in the up-down direction of the housing 10. The second portion 12B is positioned rearward of the character key set 22A in the operation unit 22 at a position downward than the approximate center in the up-down direction of the housing 10. The third portion 12C is an area between the first portion 12A and the second portion 12B, and is positioned rearward of the function key set 22B in the operation unit 22.

The area in the upper portion of the housing 10 in which the display unit 21 is provided expands further rearward than the area in the lower portion of the housing 10 in which the character key set 22A in the operation unit 22 is provided. Therefore, the first portion 12A is positioned rearward relative to the second portion 12B. The third portion 12C is curved frontward as extending from the first portion 12A toward the second portion 12B to connect the first portion 12A and the second portion 12B to each other.

The first portion 12A has a portion positioned at the same position in the up-down direction as the first attachment portions 31 and 32, and the second portion 12B has a portion positioned at the same position in the up-down direction as the second attachment portions 33 and 34.

Protective members 26 having elasticity are provided along edges of the front surface 11, the rear surface 12, the left surface 13, the right surface 14, the upper surface 15, and the lower surface 16 of the housing 10. The protective members 26 are made of elastomer. The protective members 26 cover and protect connecting portions at which the edges of the respective surfaces meet, while middle portions of the respective surfaces are exposed. The first attachment portions 31 and 32 and the second attachment portions 33 and 34 (described later) provided on the left surface 13 and the right surface 14 are formed in areas different from areas covered by the protective members 26. In other words, the protective members 26 are provided so as to avoid areas in which the first attachment portions 31 and 32 and the second attachment portions 33 and 34 are formed and to cover the connecting portions at which the edges of the respective surfaces meet.

Figure 4:
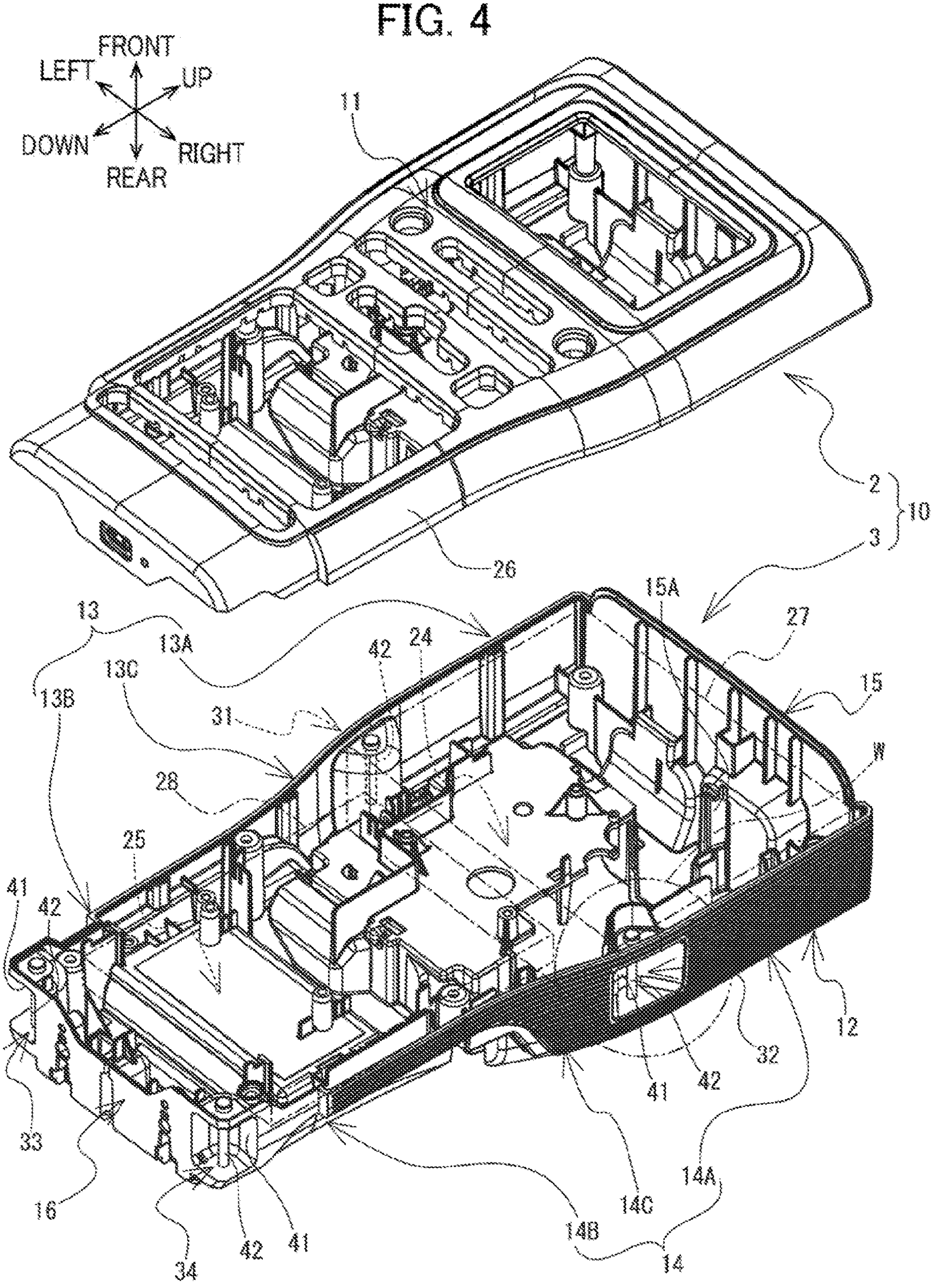
FIG. 4 is an exploded perspective view of a front housing 2 and a rear housing 3.

As illustrated in FIG. 4, the housing 10 is divided into a front housing 2, and a rear housing 3. The front housing 2 has the front surface 11. The rear housing 3 has the rear surface 12, the left surface 13, the right surface 14, the upper surface 15, and the lower surface 16. The housing 10 forms a box shape when the front housing 2 and the rear housing 3 are assembled together in the front-rear direction. The printing device 1 further includes a printing unit 27 and a controller 28 which are accommodated in the housing 10.

The printing unit 27 is disposed frontward of the cassette attachment portion 24 and rearward of the display unit 21 and the function key set 22B in the operation unit 22. The printing unit 27 is configured to perform printing on tape, and includes a printing head, a platen roller, a drive motor, and the like (not illustrated). As the drive motor in the printing unit 27 drives the platen roller, the platen roller pulls tape out of the tape cassette and conveys the tape while the printing head performs printing on the tape. The printed tape is discharged out of the printing device 1 through a discharge opening 15A formed in the upper surface 15.

The controller 28 is disposed frontward of the battery attachment portion 25 and rearward of the character key set 22A in the operation unit 22. The controller 28 includes a CPU, ROM, RAM, and the like (not illustrated), and is configured to control drive of the printing device 1 (the printing unit 27).

The printing unit 27 includes many mechanical structures and is heavier than the controller 28. Therefore, it is preferable that the center of gravity G of the printing device 1 (see FIG. 2) is arranged between the first attachment portions 31 and 32 and the corresponding second attachment portions 33 and 34 in the up-down direction. In the present embodiment, the center of gravity G of the printing device 1 is arranged upward than the approximate center in the up-down direction of the housing 10 and aligned with the function key set 22B.

The user may hold the printing device 1 by attaching both ends of an accessory to the first attachment portion 31 and the second attachment portion 33 and by inserting a hand between the accessory and the left surface 13 of the housing 10, for example. In this case, the user can more easily balance a weight of the printing device 1 when the center of gravity G is located in the area of the printing device 1 supported by the user's palm, enabling the user to more easily hold the printing device 1.

Next, the first attachment portions 31 and 32 and the second attachment portions 33 and 34 will be described with reference to FIGS. 4 through 7. The first attachment portions 31 and 32 and the second attachment portions 33 and 34 are portions to which an arm, a belt, a strap, or other accessory used for assisting the user in holding the printing device 1 is attachable. The first attachment portions 31 and 32 are provided on lower end portions of the respective first portions 13A and 14A of the corresponding left surface 13 and right surface 14. Each of the first attachment portions 31 and 32 is configured of a recess 41 formed in the corresponding first portions 13A and 14A, and a shaft member 42 retained inside the recess 41.

The second attachment portions 33 and 34 are provided on lower end portions of the respective second portions 13B and 14B of the corresponding left surface 13 and right surface 14. Each of the second attachment portions 33 and 34 is also configured of a recess 41 formed in a corner at which a lower end of the corresponding first portions 13A and 14A meets a corresponding left or right end of the lower surface 16, and a shaft member 42 retained inside the recess 41.

Although the shapes of the recesses 41 and directions in which the recesses 41 are open differ from one another, the first attachment portions 31 and 32 and the second attachment portions 33 and 34 all have a similar configuration. Therefore, the configuration of the first attachment portion 32 on the right surface 14 will be described below, after which the configurations of the first attachment portion 31 and the second attachment portions 33 and 34 will be described while referring to the description of the first attachment portion 32.

Figure 5:
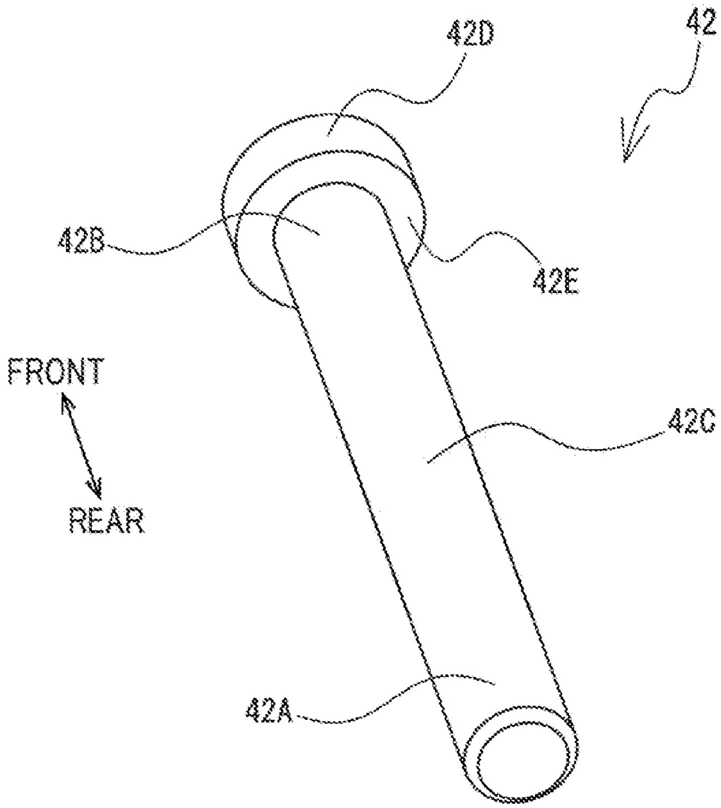
FIG. 5 is a perspective view of a shaft member 42.

As illustrated in FIG. 5, the shaft member 42 is a rod-shaped member made of metal and extends in the front-rear direction. The shaft member 42 has a rear end portion 42A, a front end portion 42B opposite the rear end portion 42A, and an intermediate portion 42C between the rear end portion 42A and the front end portion 42B. A head 42D is provided on the front end portion 42B. The head 42D has a seating surface 42E.

Figure 6:
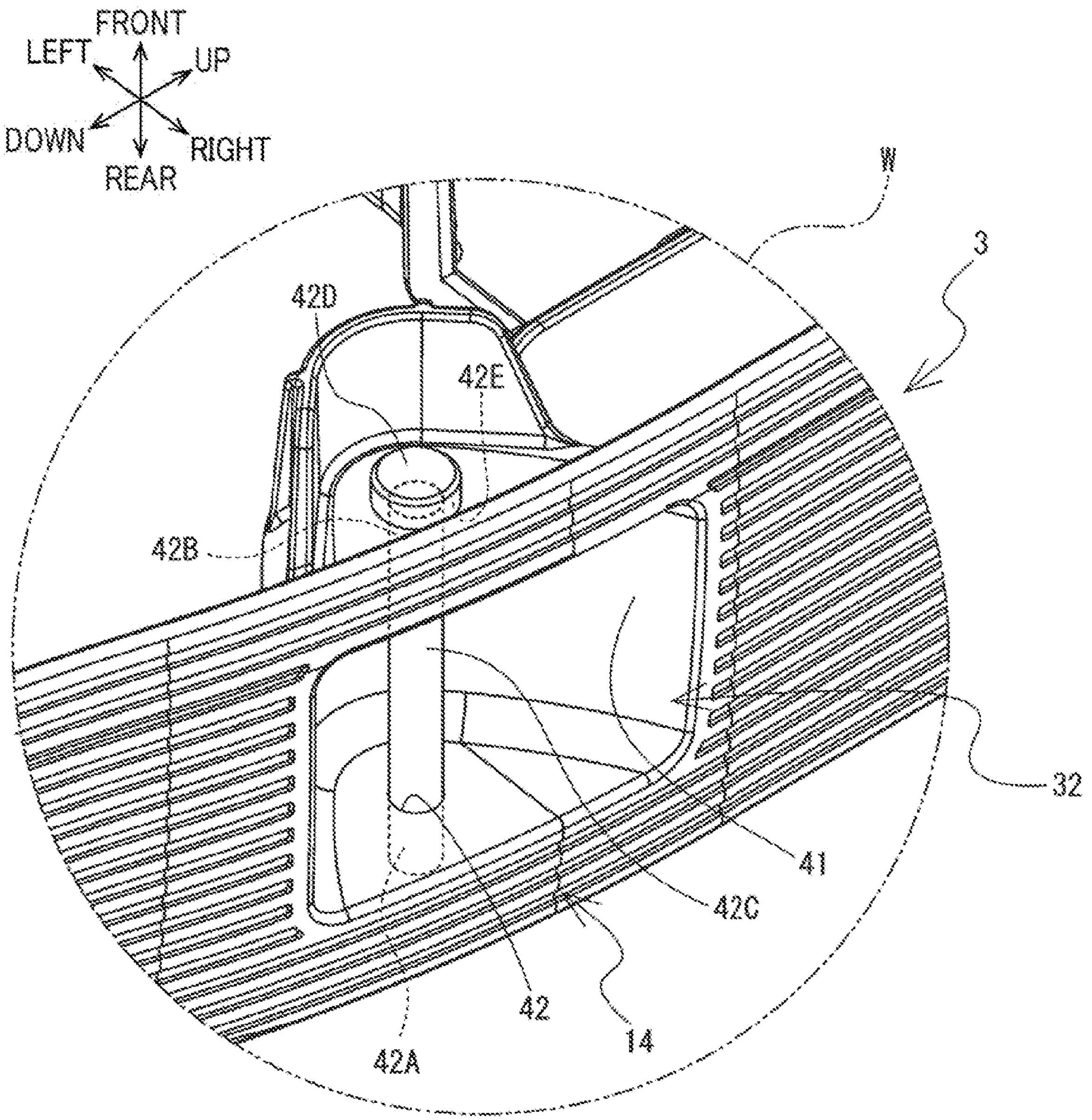
FIG. 6 is an enlarged view of a circle W indicated by a two-dotted chain line in FIG. 4.
Figure 7:
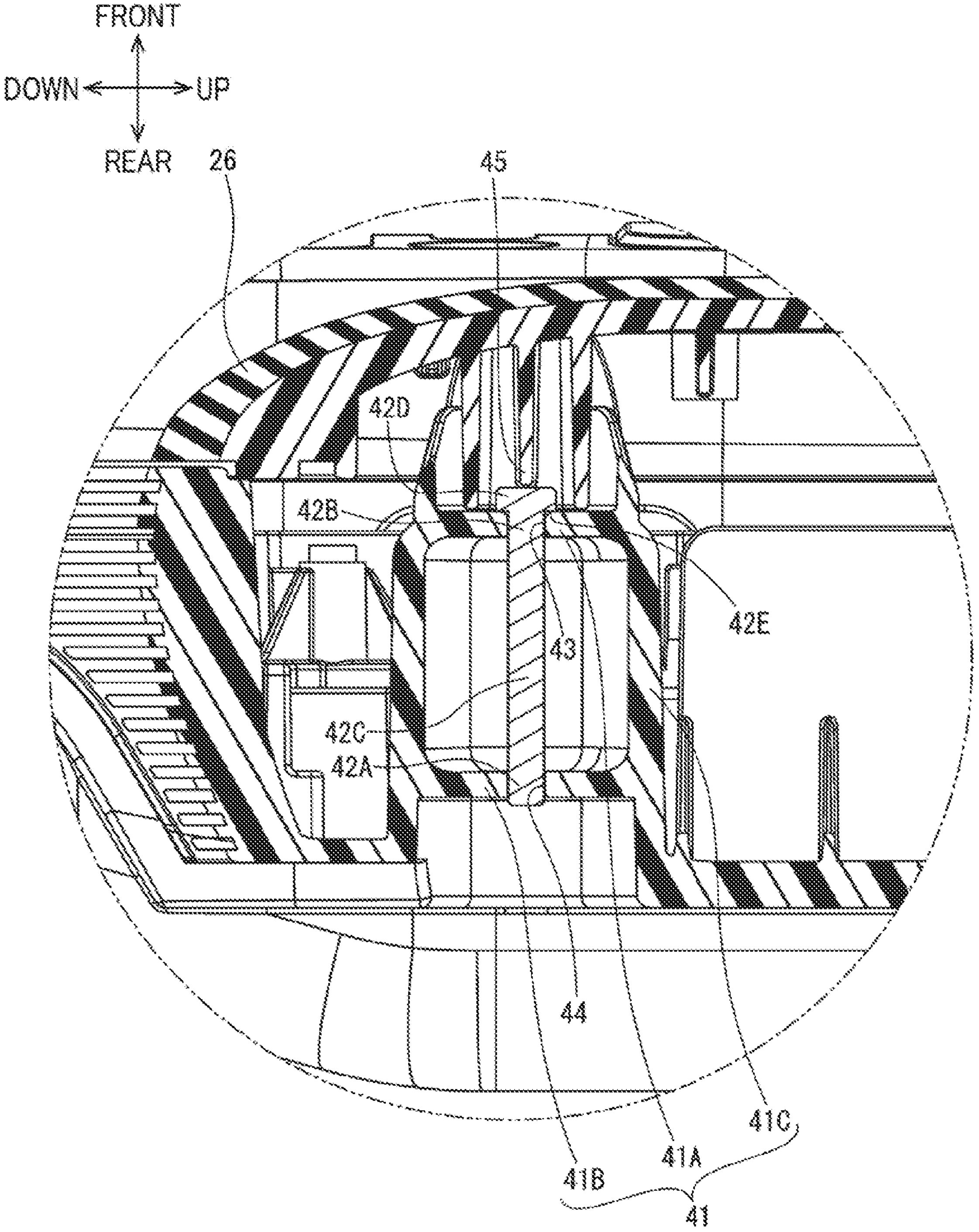
FIG. 7 is a partial cross-sectional view of the printing device 1 taken along line VII-VII in FIG. 2.

As illustrated in FIGS. 6 and 7, the recess 41 of the first attachment portion 32 is open on the right surface 14. The recess 41 is formed in the rear housing 3 and includes a front wall 41A, a rear wall 41B, and a peripheral wall 41C. The front wall 41A and the rear wall 41B face each other in the front-rear direction. The peripheral wall 41C connects upper edges, left edges, and lower edges of the front wall 41A and the rear wall 41B in the front-rear direction, and allows the recess 41 to be open rightward.

The front wall 41A and the rear wall 41B have through-holes 43 and 44, respectively, that penetrate the front wall 41A and the rear wall 41B in the front-rear direction. The through-holes 43 and 44 are formed at the same position in the up-down direction and the left-right direction so as to overlap each other in the front-rear direction. Inner diameters of the through-holes 43 and 44 are slightly greater than an outer diameter of the shaft member 42 (an outer diameter of the rear end portion 42A) and smaller than an outer diameter of the head 42D.

The rear end portion 42A of the shaft member 42 is inserted through the through-hole 43 of the front wall 41A from the front side and then inserted but not press-fitted into the through-hole 44 of the rear wall 41B. The rear end portion 42A of the shaft member 42 is supported in the through-hole 44 of the rear wall 41B. The front end portion 42B of the shaft member 42 is disposed inside but is not press-fitted in the through-hole 43 of the front wall 41A. The seating surface 42E on the head 42D contacts a front surface of the front wall 41A to position the shaft member 42 relative to the recess 41.

In the meantime, the front housing 2 includes a protruding portion 45 that protrudes rearward at a position aligned with the through-hole 43 in the up-down direction and the left-right direction. In a state where the front housing 2 is assembled with the rear housing 3, a protruding end of the protruding portion 45 contacts or is placed in a position slightly separated from the head 42D of the shaft member 42 to prevent the shaft member 42 from sliding out of the through-holes 43 and 44. Thus, the head 42D of the shaft member 42 is interposed between the front surface of the front wall 41A of the recess 41 and the protruding end of the protruding portion 45 to maintain the front end portion 42B in the through-hole 43. The intermediate portion 42C between the rear end portion 42A and the front end portion 42B of the shaft member 42 is exposed to an outside through the recess 41.

Since the protruding end of the protruding portion 45 is in contact with or slightly separated from the head 42D of the shaft member 42, the protruding portion 45 restricts movement in the front-rear direction of the shaft member 42 without pressing the head 42D against the front wall 41A. Therefore, the shaft member 42 can be supported in the through-holes 43 and 44 while being allowed to rotate in a circumferential direction of the shaft member 42 about an axis of the shaft member 42. By rotating, the shaft member 42 suppresses wear on an accessory when an accessory is attached thereto. When an accessory attached to the intermediate portion 42C of the shaft member 42 is pulled on the shaft member 42, the rear end portion 42A and the front end portion 42B contact the respective through-holes 43 and 44 and the seating surface 42E on the head 42D contacts the front surface of the front wall 41A to disperse stress acting on the shaft member 42.

The first attachment portion 31 supports a shaft member 42 in a recess 41 according to a similar configuration as the first attachment portion 32, except that the recess 41 in the first attachment portion 31 is open leftward. Similarly, the second attachment portions 33 and 34 support shaft members 42 in respective recesses 41 according to the same configuration as the first attachment portion 32, except that the recesses 41 in the second attachment portions 33 and 34 are open toward the side (leftward and rightward, respectively) and downward.

The printing device 1 according to the present embodiment has attachment portions for attaching an accessory at two points on each of the left surface 13 and the right surface 14. When attaching a strap-like accessory, for example, the user can attach the accessory to one of the first attachment portions 31 and 32 or one of the second attachment portions 33 and 34, depending on the user's dominant hand or the intended use, and then can place the strap around the user's wrist to avoid dropping the printing device 1. When attaching a belt-like accessory, the user can attach both ends of the belt to two of the first attachment portions 31 and 32 and the second attachment portions 33 and 34, depending on the user's dominant hand or the intended use.

Figure 8:
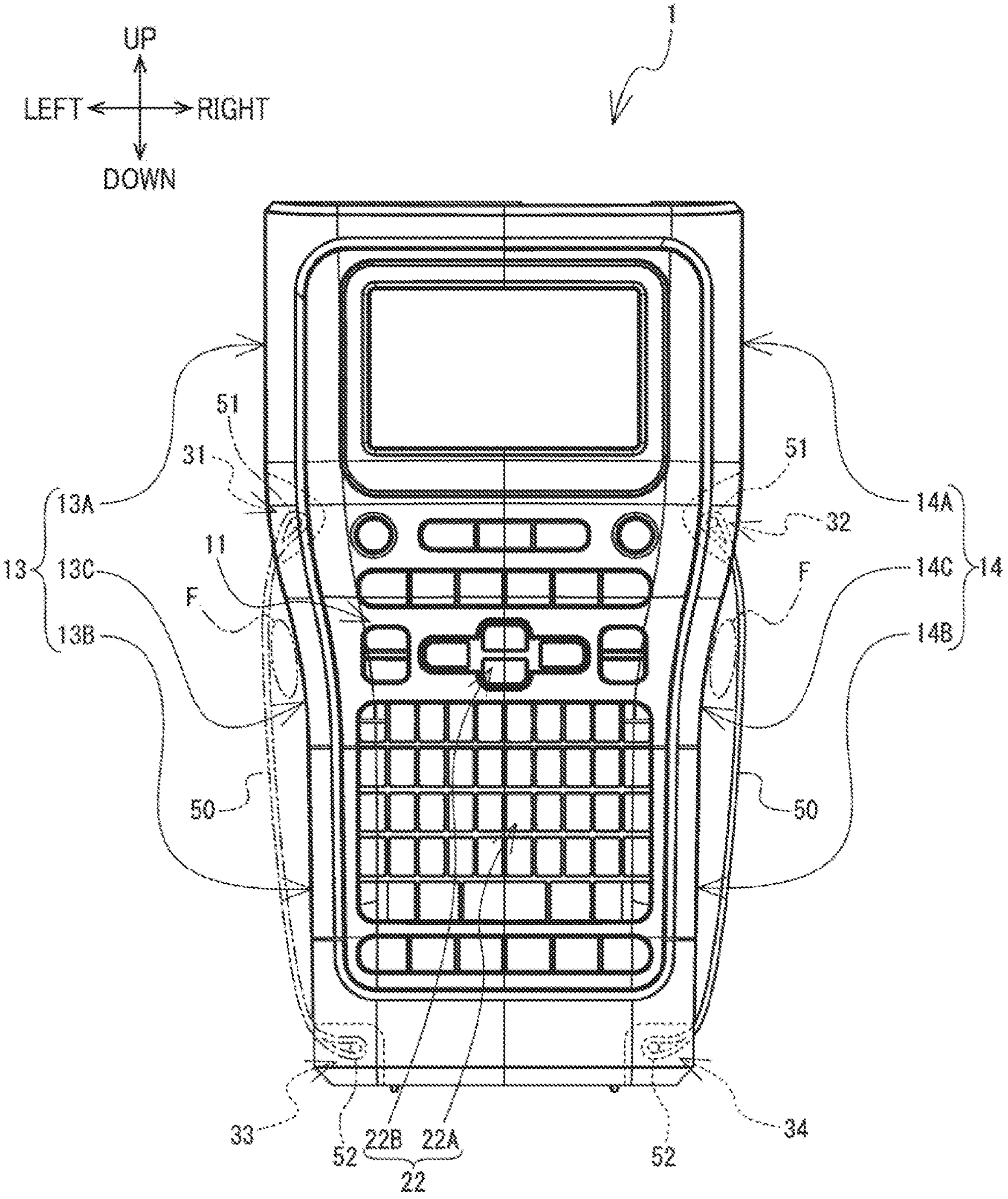
FIG. 8 is a front view of the printing device 1 in which respective ends of a belt 50 is attached to a first attachment portion 32 and a second attachment portion 34.

When a belt 50 having flexibility is used as the accessory, the user can attach one end 51 of the belt 50 to the first attachment portion 32 on the right surface 14 and can attach another end 52 of the bet 50 to the second attachment portion 34 on the right surface 14, as illustrated in an example of FIG. 8. Since the first attachment portion 32 is positioned further rightward than the second attachment portion 34 and the third portion 14C is curved in a concave shape, a gap F in the left-right direction is formed between the third portion 14C and the belt 50. In order to hold the printing device 1, the user can easily insert the hand into the gap F and place the same between the right surface 14 and the belt 50. By supporting the printing device 1 in the user's palm and with the assistance of the belt 50, the user can hold the printing device 1 with one hand.

The user may also attach the one end 51 of the belt 50 to the first attachment portion 31 on the left surface 13 and the other end 52 of the belt 50 to the second attachment portion 33 on the left surface 13, as indicated by one-dotted chain lines in FIG. 8. In this case as well, the user can insert the hand into a gap F between the third portion 13C and the belt 50, and easily hold the printing device 1 with one hand using the assistance of the belt 50. Alternatively, the user may attach both ends of one belt 50 to the first attachment portion 32 and the second attachment portion 34 on the right surface 14 and attach both ends of another belt 50 to the first attachment portion 31 and the second attachment portion 33 on the left surface 13 and can use the support of the belt 50 on the side most appropriate and easiest to use.

Figure 9:
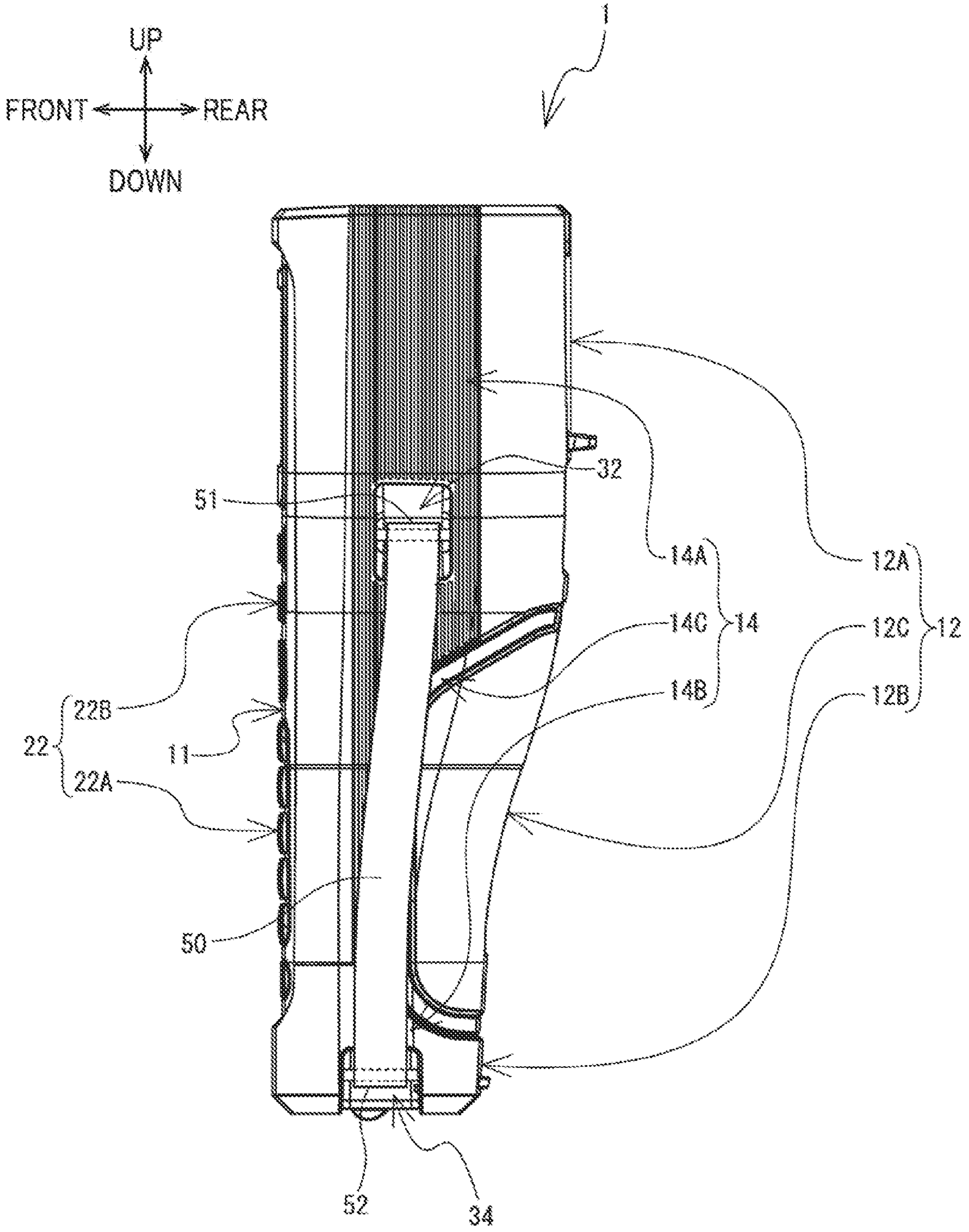
FIG. 9 is a right side view of the printing device 1 in which the respective ends of the belt 50 is attached to the first attachment portion 32 and the second attachment portion 34.

As illustrated in FIG. 9, the first attachment portion 32 is positioned further rearward than the second attachment portion 34. Therefore, a distance between the first attachment portion 32 and the second attachment portion 34 is greater in comparison with a case where the first attachment portion 32 and the second attachment portion 34 were arranged at the same position in the front-rear direction. Accordingly, a length of the belt 50 attached to the first attachment portion 32 and the second attachment portion 34 will be longer. By increasing the length of the belt 50, the user can more easily place the hand between the right surface 14 and the belt 50.

Figure 10:
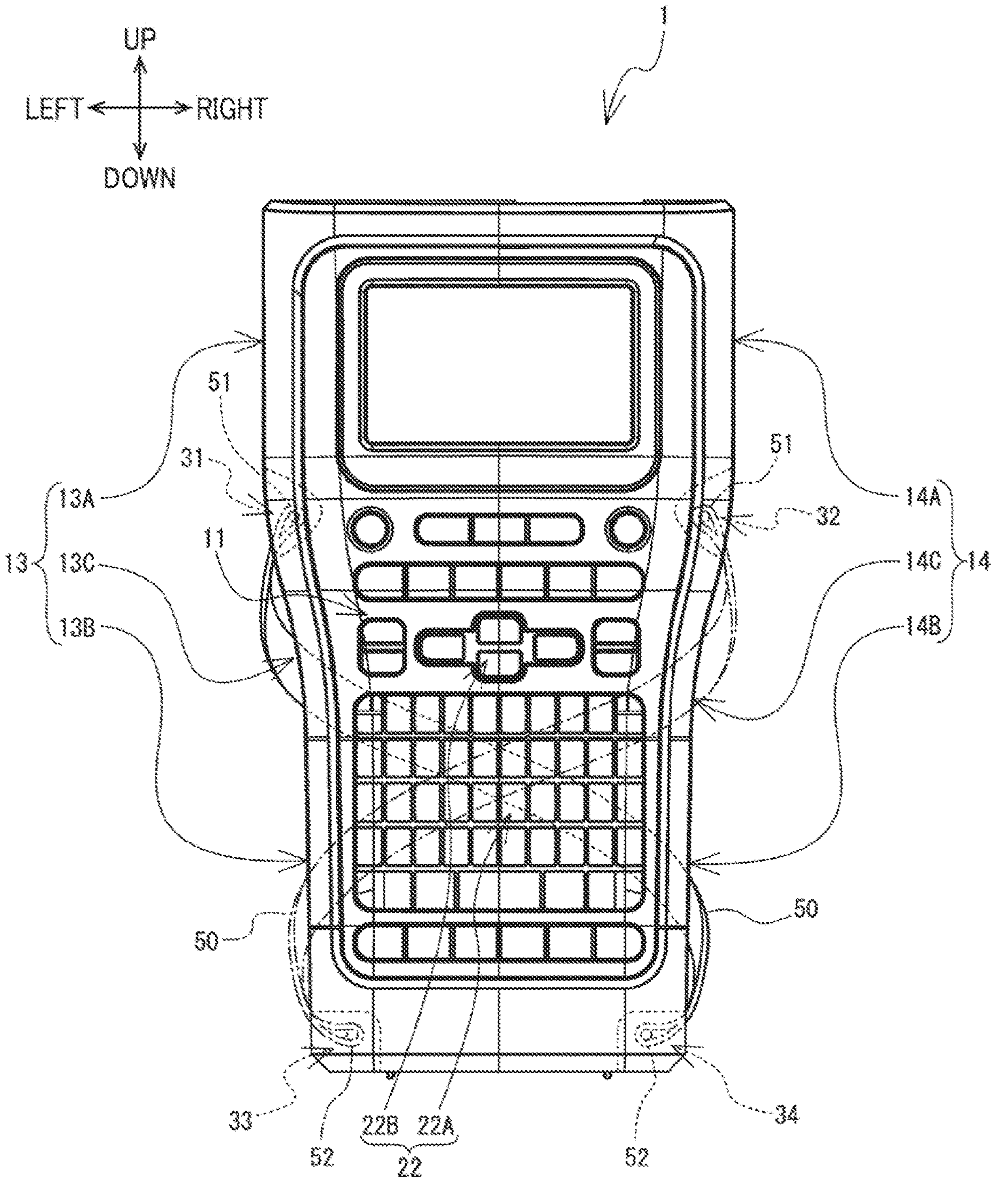
FIG. 10 is a front view of the printing device 1 in which the respective ends of the belt 50 is attached to a first attachment portion 31 and the second attachment portion 34.
Figure 11:
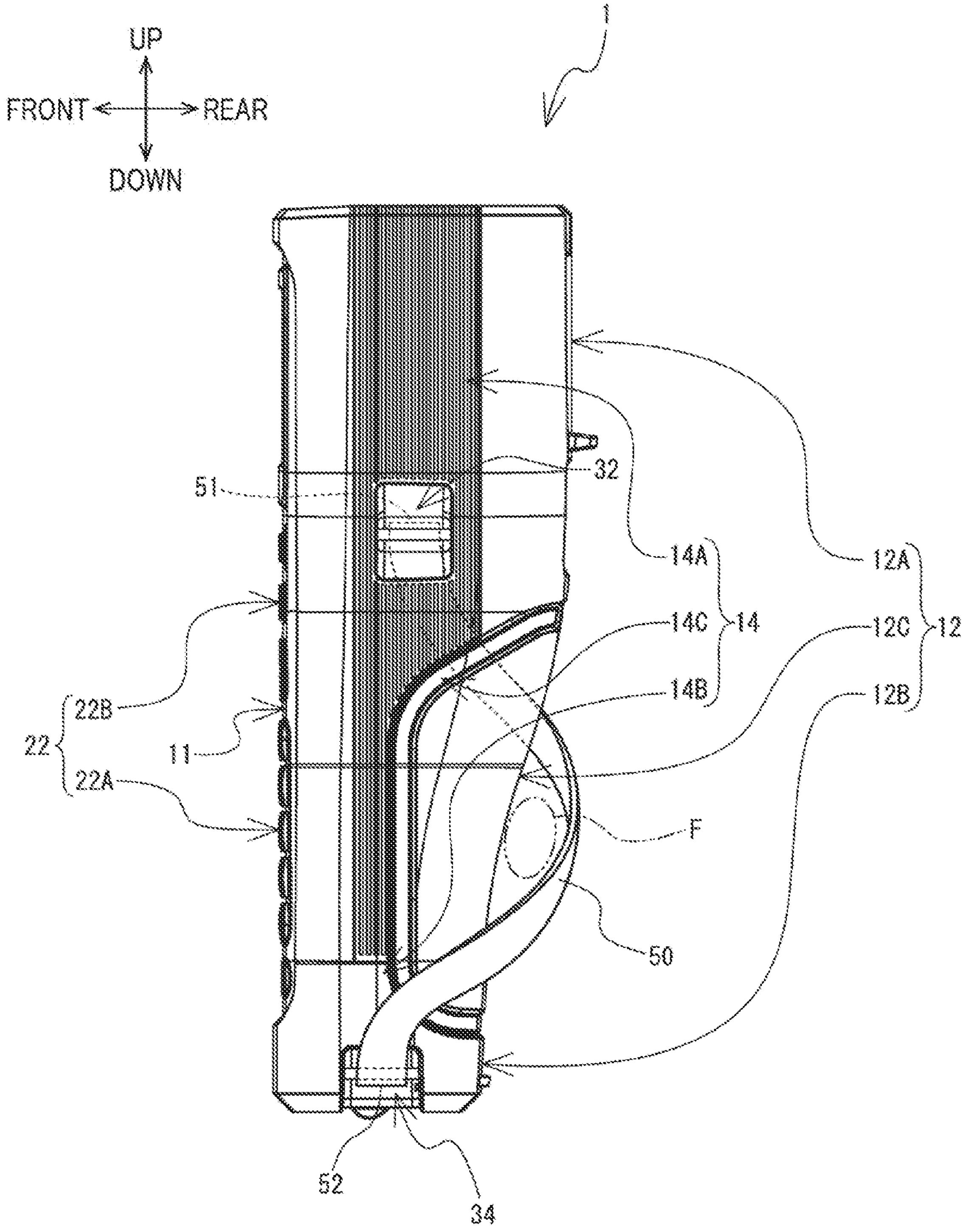
FIG. 11 is a right side view of the printing device 1 in which the respective ends of the belt 50 is attached to the first attachment portion 31 and the second attachment portion 34.

As illustrated in FIG. 10, the user may also attach the one end 51 of the belt 50 to the first attachment portion 31 on the left surface 13 and the other end 52 to the second attachment portion 34 on the right surface 14. In this case, the belt 50 is placed to extend along the rear surface 12 of the housing 10. As illustrated in FIG. 11, the first portion 12A, which is aligned in the front-rear direction with the area in which the first attachment portions 31 and 32 are provided, is positioned further rearward than the second portion 12B, which is aligned in the front-rear direction with the area in which the second attachment portions 33 and 34 are provided. Additionally, the third portion 12C is curved in a concave shape.

Therefore, a gap F in the front-rear direction is formed between the belt 50 passing along the rear surface 12 of the housing 10 and the third portion 12C. In order to hold the printing device 1, the user can easily insert the hand into the gap F and place the hand between the rear surface 12 and the belt 50. By holding the rear surface 12 of the printing device 1 with the palm of the user's hand, the user can hold the printing device 1 with one hand through the assistance of the belt 50.

The user may also attach the one end 51 of the belt 50 to the first attachment portion 32 on the right surface 14 and the other end 52 of the belt 50 to the second attachment portion 33 on the left surface 13, as indicated by one-dotted chain lines in FIG. 10. In this case as well, the user can insert the hand into the gap F between the third portion 12C and the belt 50 and can easily hold the printing device 1 with one hand while receiving assistance from the belt 50. The user may also attach both ends of one belt 50 to the first attachment portion 31 on the left surface 13 and the second attachment portion 34 on the right surface 14 and attach both ends of another belt 50 to the first attachment portion 32 on the right surface 14 and the second attachment portion 33 on the left surface 13, and may use the belt 50 that is most appropriate and easiest to use for assistance.

Figure 12:
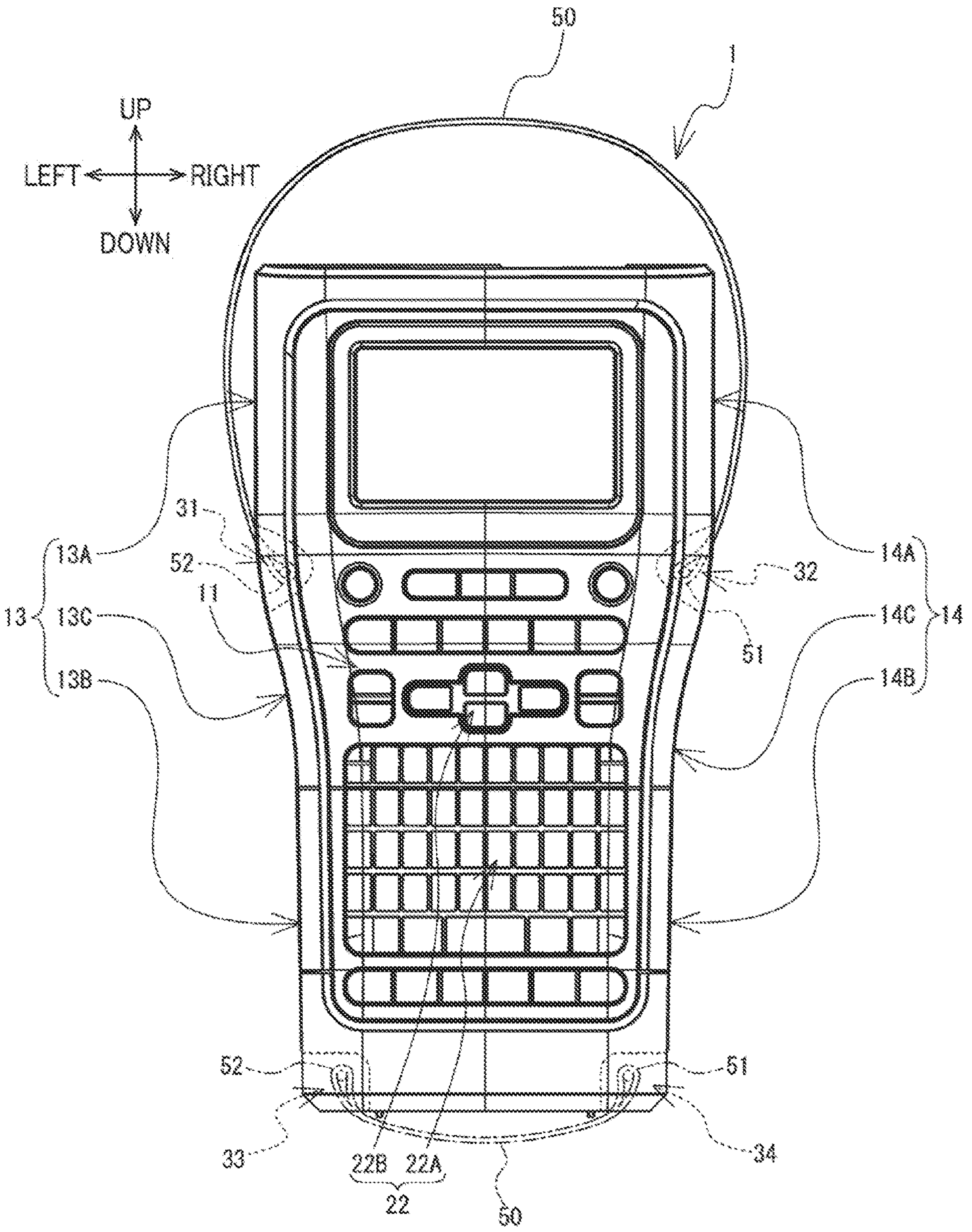
FIG. 12 is a front view of the printing device 1 in which the respective ends of the belt 50 is attached to the first attachment portion 31 and the first attachment portion 32.

As illustrated in FIG. 12, the user can also attach the one end 51 of the belt 50 to the first attachment portion 32 on the right surface 14 and the other end 52 of the belt 50 to the first attachment portion 31 on the left surface 13. In this case, the user can easily carry the printing device 1 by holding the belt 50. Similarly, the user may attach the one end 51 of the belt 50 to the second attachment portion 34 on the right surface 14 and the other end 52 of the belt 50 to the second attachment portion 33 on the left surface 13, as indicated by one-dotted chain lines in FIG. 12. In this case as well, the user can easily carry the printing device 1 by holding the belt 50. Alternatively, the user may attach both ends of one belt 50 to the first attachment portion 31 on the left surface 13 and the first attachment portion 32 on the right surface 14 and attach both ends of another belt 50 to the second attachment portion 33 on the left surface 13 and the second attachment portion 34 on the right surface 14 and may use the belt 50 that is most appropriate and easiest to use for assistance.

As described above, by attaching belt(s) 50 to the first attachment portions 31 and 32 and the second attachment portions 33 and 34, the user can insert a hand between the housing 10 and the belt 50 to hold the printing device 1 with one hand during use. This configuration can reduce the user's burden caused by the weight of the printing device 1 when the user is holding the printing device 1. The printing device 1 can also be carried by holding the belt 50, thereby reducing the user's burden when carrying the printing device 1.

The belt 50 is attachable to the first attachment portion 31 and the second attachment portion 33 on the left surface 13, or to the first attachment portion 32 and the second attachment portion 34 on the right surface 14. This arrangement enables the user to use the printing device 1 with one hand by inserting the hand between the left surface 13 or the right surface 14 and the belt 50 and supporting the housing 10 with the palm of the hand.

When the user holds the printing device 1 with one hand, at least a part of the operation unit 22 is positioned in the area in the up-down direction between the first attachment portions 31 and 32 and the second attachment portions 33 and 34 in which the weight is directly applied to the user's hand. Therefore, the printing device 1 can reduce the load on the user during one-handed operations. Further, in a case where the entire operation unit 22 is positioned between the first attachment portions 31 and 32 and the second attachment portions 33 and 34 in the up-down direction, the load of the printing device 1 imparted on the user during one-handed operations can be further reduced.

When the user holds the printing device 1 with one hand, the center of gravity G of the printing device 1 is positioned in the area in the up-down direction between the first attachment portions 31 and 32 and the second attachment portions 33 and 34 in which the weight of the printing device 1 is directly applied to the user's hand. Therefore, the load applied to the user when holding the printing device 1 with one hand can be further reduced.

The display unit 21 is positioned upward than the first attachment portions 31 and 32. Therefore, the user can easily see the display unit 21 since the display unit 21 is located upper than a position of the user's hand when the user holds the printing device 1 with one hand.

The first attachment portion 31 and the second attachment portion 33 are provided at different positions in the left-right direction, and the first attachment portion 32 and the second attachment portion 34 are provided at different positions in the left-right direction. Therefore, when the belt 50 is attached to the first attachment portion 31 and the second attachment portion 33 or to the first attachment portion 32 and the second attachment portion 34, a gap F is formed between the left surface 13 or the right surface 14 and the belt 50. Accordingly, the user can easily hold the printing device 1 with one hand by inserting the hand into the gap F.

When the user attaches the belt 50 to the first portion 13A and the second portion 13B or to the first portion 14A and the second portion 14B, the user can easily insert a hand between the third portion 13C or the third portion 14C, which is curved in a concave shape, and the belt 50 and can easily hold the printing device 1 with one hand.

The first attachment portion 31 and the second attachment portion 33 are provided in different positions in the front-rear direction, and the first attachment portion 32 and the second attachment portion 34 are provided at different positions in the front-rear direction. This configuration produces greater a distance between the first attachment portion 31 and the second attachment portion 33 and between the first attachment portion 32 and the second attachment portion 34. Accordingly, the user can easily insert a hand between the left surface 13 or the right surface 14 and the belt 50 when the belt 50 is attached thereto, and can easily hold the printing device 1 with one hand.

The belt 50 may be attached to the first attachment portion 31 on the left surface 13 and the second attachment portion 34 on the right surface 14 or to the first attachment portion 32 on the right surface 14 and the second attachment portion 33 on the left surface 13. In this case, the user can easily insert a hand between the third portion 12C, which is curved in a concave shape, and the belt 50 and can easily hold the printing device 1 with one hand.

By supporting the head 42D of the shaft member 42 on the front wall 41A of the recess 41, each of the first attachment portions 31 and 32 and the second attachment portions 33 and 34 can absorb external forces acting on the shaft member 42, not only with the through-holes 44 and 43 respectively supporting the rear end portion 42A and the front end portion 42B of the shaft member 42, but also with the front surface of the front wall 41A in contact with the seating surface 42E on the head 42D. This configuration ensures that the first attachment portions 31 and 32 and the second attachment portions 33 and 34 have sufficient strength to support the shaft members 42.

The front housing 2 includes the protruding portions 45 arranged so that the heads 42D are interposed between the protruding portions 45 and the corresponding front walls 41A of the recesses 41 in the rear housing 3 in a state where the front housing 2 and the rear housing 3 are assembled with each other. Therefore, the shaft members 42 can easily be provided in the printing device 1 without requiring an operation to fix the shaft members 42 during assembly.

Since the intermediate portions 42C of the shaft members 42 are exposed to the outside through the respective recesses 41, the user can easily attach the belt 50 to the shaft members 42.

Since the shaft members 42 are made of metal, the printing device 1 can ensure sufficient strength of the shaft members 42.

The shaft members 42 are supported to be rotatable in the circumferential direction thereof, thereby suppressing wear on the belt 50 caused by friction generated between the belt 50 and the shaft members 42.

The first attachment portions 31 and 32 and the second attachment portions 33 and 34 are provided so as to avoid areas covered by the protective members 26. Hence, the protective members 26 can reliably protect the printing device 1.

The belt 50 is attachable to the first attachment portion 31 and the second attachment portion 33 on the left surface 13 and/or to the first attachment portion 32 and the second attachment portion 34 on the right surface 14. The belt 50 is also attachable to the first attachment portion 31 on the left surface 13 and the second attachment portion 34 on the right surface 14 and/or to the first attachment portion 32 on the right surface 14 and the second attachment portion 33 on the left surface 13. The belt 50 is also attachable to the first attachment portion 31 on the left surface 13 and the first attachment portion 32 on the right surface 14 and/or to the second attachment portion 33 on the left surface 13 and the second attachment portion 34 on the right surface 14. Therefore, the user can easily hold the printing device 1 with the left or right hand and can easily carry the printing device 1 by attaching the belt 50 to desired points.

Modifications

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

The protective member 26 need not be limited to be made of elastomer but may be made of rubber having elasticity or resin material. Further, while the belt 50 is used as an example of the accessory in the above embodiment, an arm member with a fixed shape may be attached to the first attachment portions 31 and 32 and the second attachment portions 33 and 34.

The first portions 13A and 14A on the respective left surface 13 and right surface 14 may be arranged at the same positions in the left-right direction as the second portions 13B and 14B, respectively. In this case, a pair of protruding parts that protrude sideways (outward) in the left-right direction is formed on each of the first portions 13A and 14A, for example. A shaft member is provided to span over distal ends of the pair of protruding parts on each of the first portions 13A and 14A so that the first attachment portions 31 and 32 can be positioned outward in the left-right direction relative to the respective second attachment portions 33 and 34. Alternatively, the second portions 13B and 14B may be positioned outward in the left-right direction relative to the first portions 13A and 14A, respectively. Additionally, the second portion 12B may be positioned further rearward than the first portion 12A.

The third portion 13C on the left surface 13 and the third portion 14C on the right surface 14 are curved in concave shapes, but the third portion 13C and the third portion 14C may be connected to the respective first portions 13A and 14A and second portions 13B and 14B to form stepped parts. Similarly, the third portion 12C of the rear surface 12 is curved in a concave shape, but the third portion 12C may be connected to the first portion 12A and the second portion 12B to form a stepped part. The belt 50 may include a hook on both ends, while the first attachment portions 31 and 32 and the second attachment portions 33 and 34 may serve as engaging parts that can engage with the hooks of the belt 50.

Remarks

The printing unit 27 is an example of the "printing engine". The tape is an example of the "printing medium". The operation unit 22 is an example of the "input interface". The belt 50 is an example of the "accessory" and the "another accessory". The left surface 13, the right surface 14, the upper surface 15, and the lower surface 16 are an example of the "peripheral surface", the "first side surface" and the "second side surface". The display unit 21 is an example of the "display". The third portions 13C and 14C are examples of the "connecting portion of the first side surface". The third portion 12C is an example of the "connecting portion of the rear surface". The rear housing 3 is an example of the "main housing". The front wall 41A and the rear wall 41B are an example of the "support portion". The rear wall 41B and the through-hole 44 are an example of the "first support portion", and the front wall 41A and the through-hole 43 are an example of the "second support portion". The protective members 26 are an example of the "protecting portion".

What is claimed is:

1. A printing device comprising:

a printing engine configured to perform printing on a printing medium;

a controller configured to control drive of the printing engine;

an input interface through which a user can input an instruction into the controller; and a housing accommodating therein the printing engine and the controller, wherein the housing comprises:

a first attachment portion to which one end of an accessory for the user to hold the printing device is attachable; and a second attachment portion to which another end of the accessory is attachable, and wherein the housing has:

a front surface on which the input interface is provided;

a rear surface opposing the front surface in a front-rear direction; and a peripheral surface connecting the front surface and the rear surface to each other, the first attachment portion and the second attachment portion being provided on the peripheral surface, wherein the peripheral surface has a first side surface and a second side surface which oppose each other in a left-right direction, wherein the first attachment portion and the second attachment portion are provided on the first side surface and are arranged in an up-down direction with a gap formed therebetween in the up-down direction in a state where the printing device is in a normal posture when the user holds the printing device with one hand and operates the input interface, and wherein the accessory is a belt.

2. The printing device according to claim 1, wherein at least a part of the input interface is positioned between the first attachment portion and the second attachment portion in the up-down direction.

3. The printing device according to claim 2, wherein an entirety of the input interface is positioned between the first attachment portion and the second attachment portion in the up-down direction.

4. The printing device according to claim 3, wherein a center of gravity of the printing device is positioned between the first attachment portion and the second attachment portion in the up-down direction.

5. The printing device according to claim 4, further comprising:
a display provided on the front surface, the display being configured to display thereon information related to an operation of the input interface,
wherein the display is positioned upward relative to the first attachment portion in the up-down direction.

6. The printing device according to claim 5, wherein the first attachment portion and the second attachment portion are at different positions in the left-right direction.

7. The printing device according to claim 1, wherein each of the first attachment portion and the second attachment portion comprises a shaft member extending in the front-rear direction, the shaft member having:
a front end portion;
a rear end portion opposite the front end portion; and
an intermediate portion between the front end portion and the rear end portion, and
wherein the intermediate portion is exposed to an outside, and the front end portion and the rear end portion are supported by a support portion of the corresponding one of the first attachment portion and the second attachment portion.

8. The printing device according to claim 7, wherein the housing further comprises:
a main housing having the peripheral surface and the rear surface; and
a front housing having the front surface, the front housing being assembled with the main housing, and
wherein the support portion comprises:
a first support portion supporting the rear end portion of the shaft member; and
a second support portion supporting the front end portion of the shaft member while the front end portion of the shaft member is interposed between the second support portion and the front housing.

9. The printing device according to claim 8, wherein each of the first attachment portion and the second attachment portion has a recess defined between the first support portion and the second support portion such that the intermediate portion is exposed to the outside through the recess.

10. The printing device according to claim 9, wherein the shaft member is made of metal.

11. The printing device according to claim 10, wherein the shaft member is rotatable in a circumferential direction of the shaft member.

12. The printing device according to claim 11, further comprising:
a protecting portion covering edges of the front surface, the rear surface, and the peripheral surface to protect the edges,
wherein the first attachment portion and the second attachment portion are provided at portions of the first side surface that are not covered by the protecting portion.

13. The printing device according to claim 1, wherein the housing further comprises:
a third attachment portion to which one end of another accessory for the user to hold the printing device is attachable; and
a fourth attachment portion to which another end of the another accessory is attachable, and
wherein the peripheral surface has:
a left surface connecting a left end portion of the front surface and a left end portion of the rear surface to each other; and
a right surface opposing the left surface in the left-right direction, the right surface connecting a right end portion of the front surface and a right end portion of the rear surface to each other,
wherein the first attachment portion and the second attachment portion are provided on the left surface, and
wherein the third attachment portion and the fourth attachment portion are provided on the right surface.

14. The printing device according to claim 1, wherein the input interface is provided on the front surface,
wherein the printing device further comprises:
a display provided on the front surface, the display being configured to display thereon information related to an operation of the input interface, and
wherein the input interface and the display are arranged in the up-down direction in the state where the printing device is in the normal posture when the user holds the printing device with the one hand and operates the input interface, the left-right direction being perpendicular to the up-down direction.

15. A printing device comprising:
a printing engine configured to perform printing on a printing medium;
a controller configured to control drive of the printing engine;
an input interface through which a user can input an instruction into the controller; and
a housing accommodating therein the printing engine and the controller,
wherein the housing comprises:
a first attachment portion to which one end of an accessory for the user to hold the printing device is attachable; and
a second attachment portion to which another end of the accessory is attachable, and
wherein the housing has:
a front surface on which the input interface is provided;
a rear surface opposing the front surface in a front-rear direction; and
a peripheral surface connecting the front surface and the rear surface to each other, the first attachment portion and the second attachment portion being provided on the peripheral surface,
wherein the peripheral surface has a first side surface and a second side surface opposing the first side surface, and
wherein the first attachment portion and the second attachment portion are provided on the first side surface and are aligned in an up-down direction in a state where the printing device is in a normal posture when the user operates the input interface, wherein the first side surface and the second side surface oppose each other in a left-right direction, and wherein the first attachment portion and the second attachment portion are at different positions in the left-right direction, wherein the first side surface comprises:

a first portion on which the first attachment portion is provided;

a second portion on which the second attachment portion is provided; and a connecting portion connecting the first portion and the second portion to each other, wherein the first portion is positioned outward in the left-right direction relative to the second portion, and wherein the connecting portion is curved inward in the left-right direction from the first portion toward the second portion.

16. The printing device according to claim 15, wherein the accessory is one of a strap, a belt, and an arm.

17. A printing device comprising:

a printing engine configured to perform printing on a printing medium;

a controller configured to control drive of the printing engine;

an input interface through which a user can input an instruction into the controller; and a housing accommodating therein the printing engine and the controller, wherein the housing comprises:

a first attachment portion to which one end of an accessory for the user to hold the printing device is attachable; and a second attachment portion to which another end of the accessory is attachable, and wherein the housing has:

a front surface on which the input interface is provided;

a rear surface opposing the front surface in a front-rear direction; and a peripheral surface connecting the front surface and the rear surface to each other, wherein the peripheral surface has:

a left surface connecting a left end portion of the front surface and a left end portion of the rear surface to each other; and a right surface opposing the left surface in a left-right direction, the right surface connecting a right end portion of the front surface and a right end portion of the rear surface to each other, wherein the first attachment portion is provided on one of the left surface and the right surface, and the second attachment portion is provided on another one of the left surface and the right surface, wherein the rear surface comprises:

a first portion and a second portion which are arranged in an up-down direction in a state where the printing device is in a normal posture when the user operates the input interface, the first portion having a portion positioned at the same position in the up-down direction as the first attachment portion, the second portion having a portion positioned at the same position in the up-down direction as the second attachment portion; and a connecting portion connecting the first portion of the rear surface and the second portion of the rear surface to each other, wherein the first portion of the rear surface is positioned rearward relative to the second portion of the rear surface, and wherein the connecting portion of the rear surface is curved frontward from the first portion of the rear surface toward the second portion of the rear surface.

18. The printing device according to claim 17, wherein the first attachment portion and the second attachment portion are provided at different positions in the front-rear direction.

19. The printing device according to claim 17, wherein the housing further comprises:

a third attachment portion to which one end of another accessory for the user to hold the printing device is attachable; and a fourth attachment portion to which another end of the another accessory is attachable, and wherein the first attachment portion and the third attachment portion are provided on the left surface, and wherein the second attachment portion and the fourth attachment portion are provided on the right surface.

* * * * *